(12) United States Patent
Robitaille

(10) Patent No.: US 6,448,668 B1
(45) Date of Patent: Sep. 10, 2002

(54) VERTICAL-AXIS WIND MILL SUPPORTED BY A FLUID

(76) Inventor: Armand Robitaille, 1075, 2 $^{ieme}$ Rang, St. Roch des Aulnaies (CA), G0R-4E0

( * ) Notice: Subject to any disclaimer, the term of this patent is extended or adjusted under 35 U.S.C. 154(b) by 0 days.

(21) Appl. No.: 09/607,714

(22) Filed: Jun. 30, 2000

Related U.S. Application Data

(60) Provisional application No. 60/141,259, filed on Jun. 30, 1999.

(51) Int. Cl.$^7$ .............................. F03B 13/00; H02P 9/04; F03D 9/00
(52) U.S. Cl. .............................. 290/54; 290/55; 290/44; 290/43
(58) Field of Search ........................ 290/55, 44; 417/7; 416/11, 3.1, 117, 119; 415/4.2, 907

(56) References Cited

U.S. PATENT DOCUMENTS

| | | | |
|---|---|---|---|
| 3,902,072 A | * 8/1975 | Quinn ........................... | 290/44 |
| 3,986,367 A | * 10/1976 | Kalpins ........................ | 61/100 |
| 4,052,134 A | * 10/1977 | Rumsey ....................... | 416/119 |
| 4,180,367 A | * 12/1979 | Drees .......................... | 416/119 |
| 4,207,741 A | * 6/1980 | Rainey ......................... | 60/496 |
| 4,418,880 A | * 12/1983 | De Waal ..................... | 244/199 |
| 4,471,665 A | * 9/1984 | Hojo et al. .................... | 74/5.9 |
| 4,603,551 A | * 8/1986 | Wood ........................... | 60/496 |
| 4,753,070 A | * 6/1988 | Werner ......................... | 60/325 |
| 4,764,313 A | * 8/1988 | Cameron et al. ............. | 261/35 |
| 4,834,610 A | * 5/1989 | Bond, III ....................... | 415/3 |
| 5,048,356 A | * 9/1991 | Levko ........................... | 74/60 |
| 6,160,336 A | * 12/2000 | Baker, Jr. et al. ............. | 310/74 |

FOREIGN PATENT DOCUMENTS

DE           2938496 A    *   4/1980

\* cited by examiner

*Primary Examiner*—Nestor Ramirez
*Assistant Examiner*—Julio R. Gonzalez

(57) ABSTRACT

A vertical-axis wind turbine installed at the top of a hillock, in a crater, is constituted of a turbine, a buoy and a cylindrical shape foundation carried over two floors, and comprising a basin located across the higher floor and an alternator room located underground. One or more rotors are suspended from the turbine but the weight thereof supported by water in the basin. The turbine has a roof in the form of a plane wing (Naca), a collecting section having a number of blades spread over all the circumference of the section leaving a series of openings by which the air strikes each blade, and a floor which receives the blades, level with the top of the hillock. A buoy wherein the water supports the weight of the turbine and rotor creates a state of weightlessness. By violent winds, the buoy may be filled with water to create inertia and the water in the basin be lowered by gravity, into an adjacent tank, to bury the turbine within the crater.

9 Claims, 5 Drawing Sheets

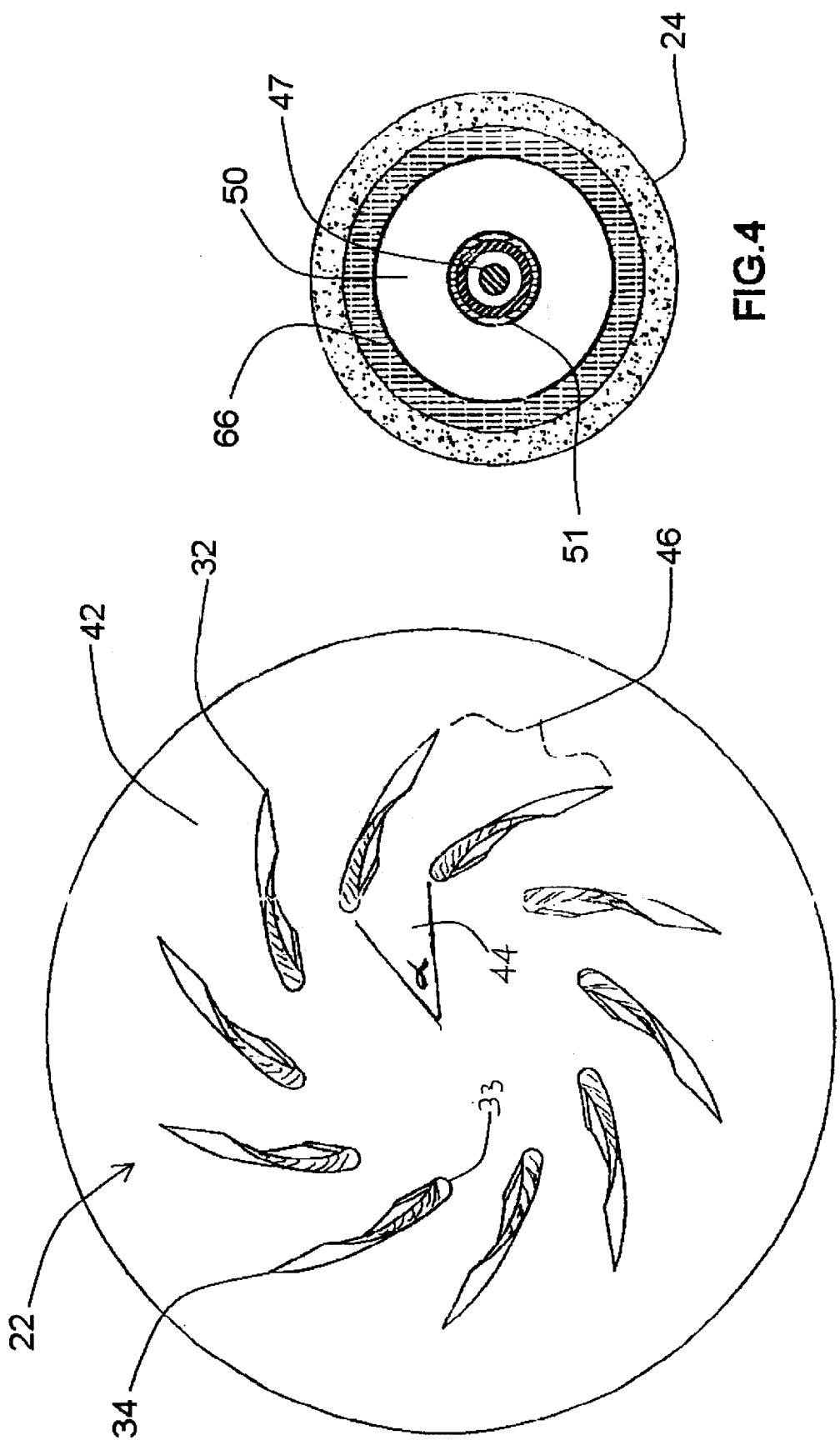

VERTICAL-AXIS WIND MILL SUPPORTED BY A FLUID

This application claims the benefit of U.S. provisional application No. 60/141,259, filed Jun. 30, 1999.

BACKGROUND—FIELD OF INVENTION

The disclosure relates to the wind turbines, more specifically those powered by the wind, about a vertical axis.

BACKGROUND—DESCRIPTION OF THE PRIOR ART

Certain patents have been drawn to our attention: DT 2758,180, Erno, Jun. 28, 1979, describes a wind turbine supported by an annular buoy and rollers that prevent the horizontal displacement and can be used as output of energy.

U.S. Pat. No. 4,199,974, Fryberger, Apr. 29, 1980, describes a wind turbine on several floors.

U.S. Pat. No. 4,457,666, Selman, Jul. 3, 1984, describes a wind powered turbine having a vertical collecting section constituted of a series of blades between two cones.

U.S. Pat. No. 4,508,972, Willmouth, Apr. 2, 1985, describes a vertical wind turbine having conical blades which are struck by the wind.

U.S. Pat. No. 5,332,925, Thomas, Jul. 26, 1994, describes a vertical wind turbine comprising several superimposed blades, which tend to break when there is too much wind. Several parts are mobile.

U.S. Pat. No. 5,391,926, Staley et al., Feb. 21, 1995, describes a wind turbine with vertical axis conceived for high winds, with external deflectors and a turbine in the centre.

U.S. Pat. No. 5,553,996, Farrar, Sep. 10, 1996, describes a turbine actuated by the wind having the blades in form of plane wings, mobile on nine pivoting axles. Blade orientation angles can be controlled.

OBJECTIVES AND ADVANTAGES

There are several objectives to be considered in the choice of a vertical-axis wind mill supported by a fluid:
- an embodiment to be built at a very large scale,
- its weight limited because of buoyancy support,
- the water does not freeze in winter (ex.: like in a well the water maintains itself at the ground temperature),
- the wind turbine installed at the top of a hillock, where the speed of wind can increase by 40% to 80%,
- the wind turbine creates its own space of installation by the fact that the surface of ground is increased according to the volume of moved soil to create the hillock,
- the material used may be Aluminum (ex. a wind turbine of 200 feet in diameter is equivalent to 140 tons of Aluminum,
- ecological,
- not noisy,
- the wind turbine uses the elements such as: water, air and ground,
- discrete in the landscape,
- the wind turbine uses three aerodynamic principles such as: Bernoulli, Venturi and Magnus,
- the wind turbine is adjustable according to the speed of wind,
- air is free and unlimited,
- the number of blades can increase or decrease according to the dimension of the turbine,

BRIEF DESCRIPTION OF THE DRAWINGS

The present invention will be further understood from the following description with reference to the drawings in which:

FIG. 3 is a section of the wind mill according to line 3—3 of FIG.2.

FIG. 4 is a section of the wind mill according to line 4—4 of FIG.2, of the embodiment of FIG. 2.

DESCRIPTION OF AN EMBODIMENT

Figure 6:
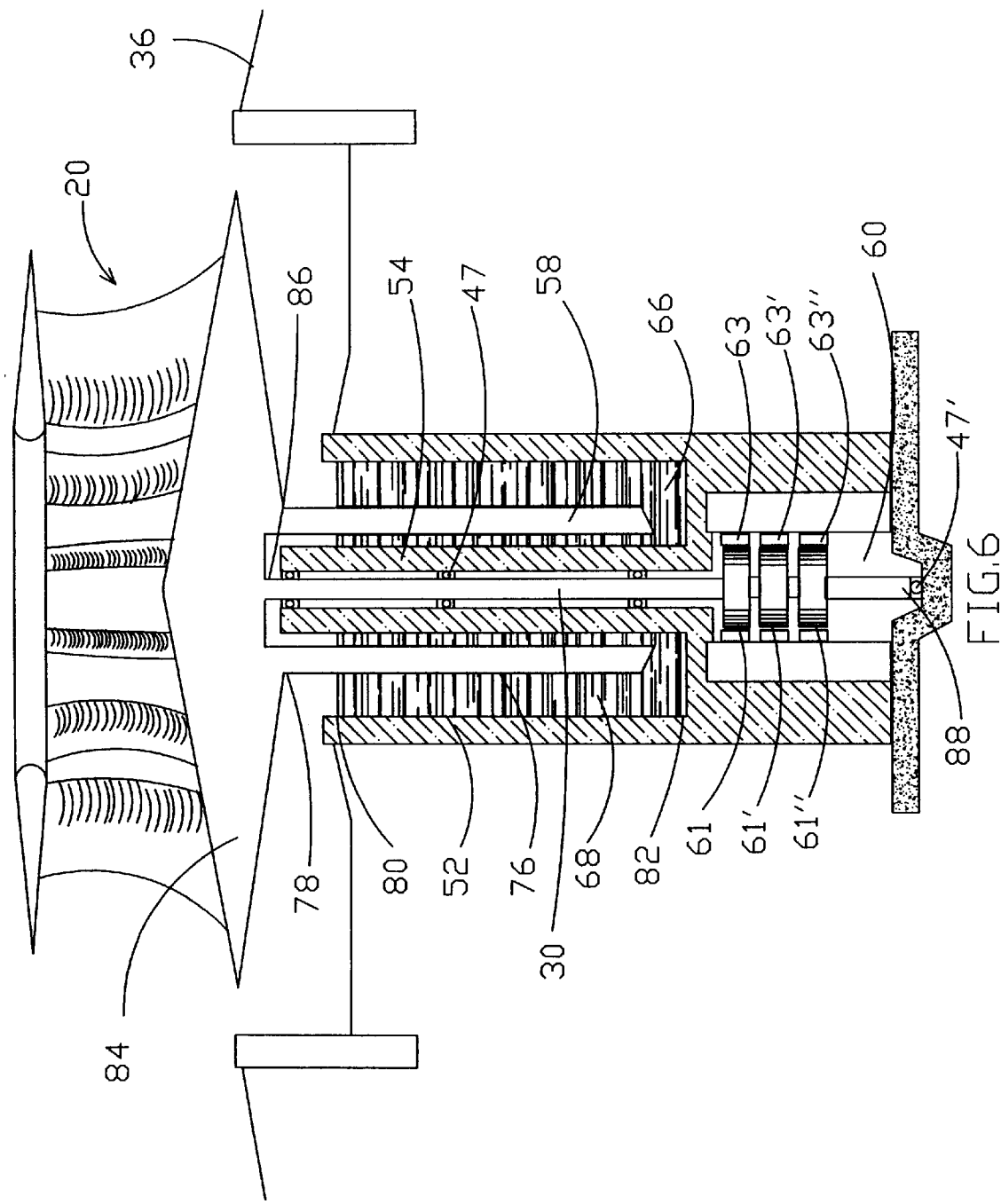
FIG. 6 is a section as per FIG. 2 of a preferred embodiment.

An embodiment of the invention is illustrated in the drawings wherein the same numbers identify the same characterising elements. As shown in FIGS. 1,2,3 and 4 a wind mill 20 with vertical axis 30, is constituted of a turbine 22, a buoy 50, and a cylindrical shape foundation 24 spread over two floors a higher floor surrounded by a ground 36 and a lower floor located below the ground 36 the higher floor supporting a basin 36 and the lower floor supporting an alternator 60 and supporting a basin 66 located on the higher floor and an alternator 60 room located in the lower floor. A rotor 61 of the alternator 60 is suspended from the turbine 22 and positioned facing a stator 63. Water in a basin 66 supports the weight of the turbine 22 and that of the rotor 61 their weight and the alignment is by a shaft about a vertical axis 30 and held in place by bearings 47. The turbine 22 comprises a collecting section 26 in sandwich between a roof 28 in the shape of a plane wing and a tunnel floor 42. The blades 32 also of the shape of a plane wing extend over all the circumference of the turbine 22 thus creating a series of openings 46 by which the air moving in strikes each blade 32. The blades are fixed to the floor 42 which is level with the top of the hillock and to the roof 28. A buoy 50 on water 68 supports the weight and allows adequate bearing for a significant mass such as that of the turbine 22 and of the rotor 61. The ball bearings 47 maintain the column central in its gyratory movement which is sliding from top to bottom. The whole of the wind turbine is assembled in a crater on the top of a hillock. By violent winds, the buoy 50 can be filled of ballast water or the level of water in the basin 66 can be lowered by gravity into an adjacent tank, to bury the turbine 22 in the crater. More water can be pumped into the basin 66. One can slow down the turbine 22 by increasing the number of rotors 61. 61', 61". Refer to FIG. 6 wherein a number of stator 63 are positioned in succession as 63' and 63". The foundation 24 has access to the outside by a door 38 and a window 40. The foundation 24 rests against ground 36.

Description of a Preferred Embodiment

Figure 1:
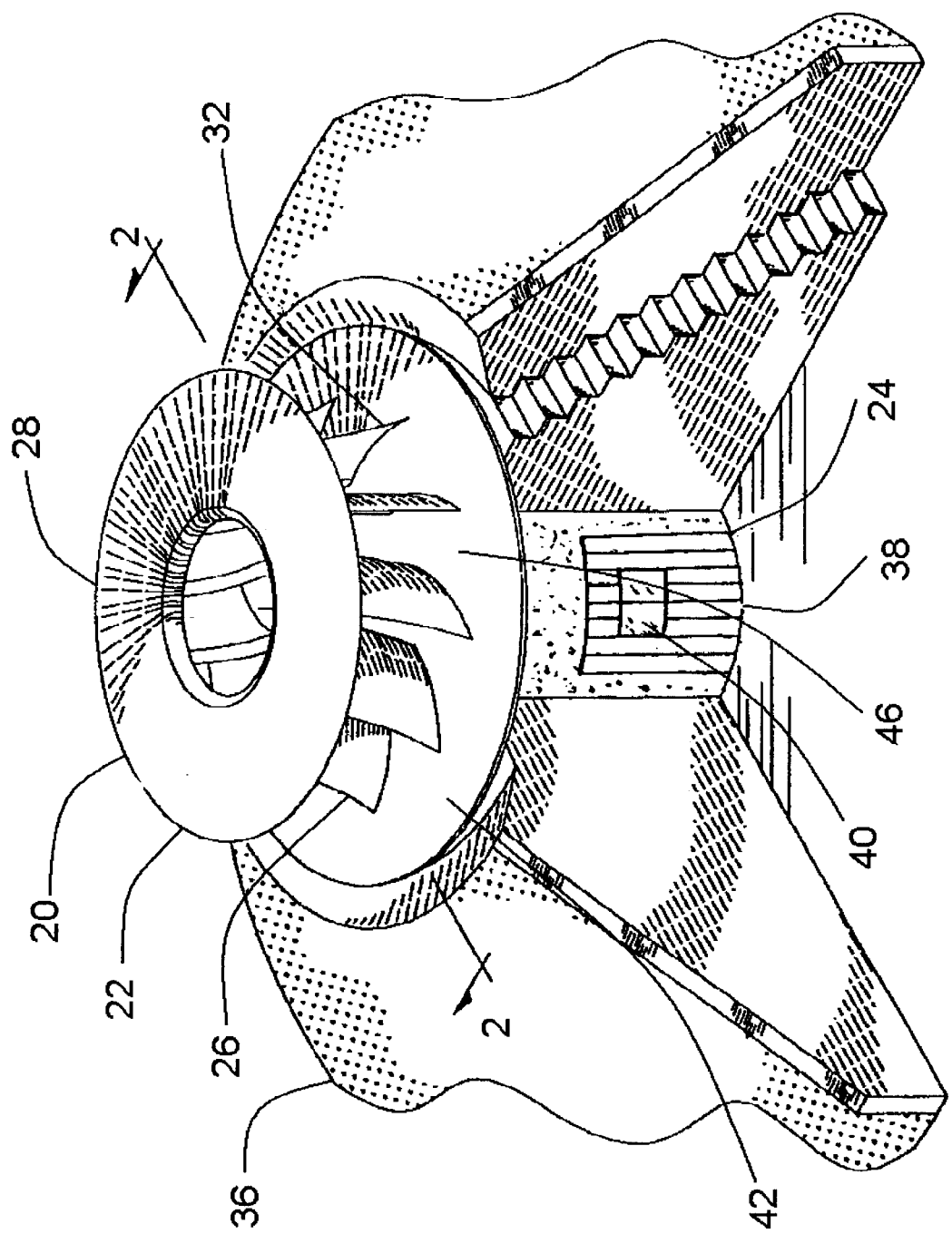
FIG. 1 shows in perspective a wind mill.
Figure 2:
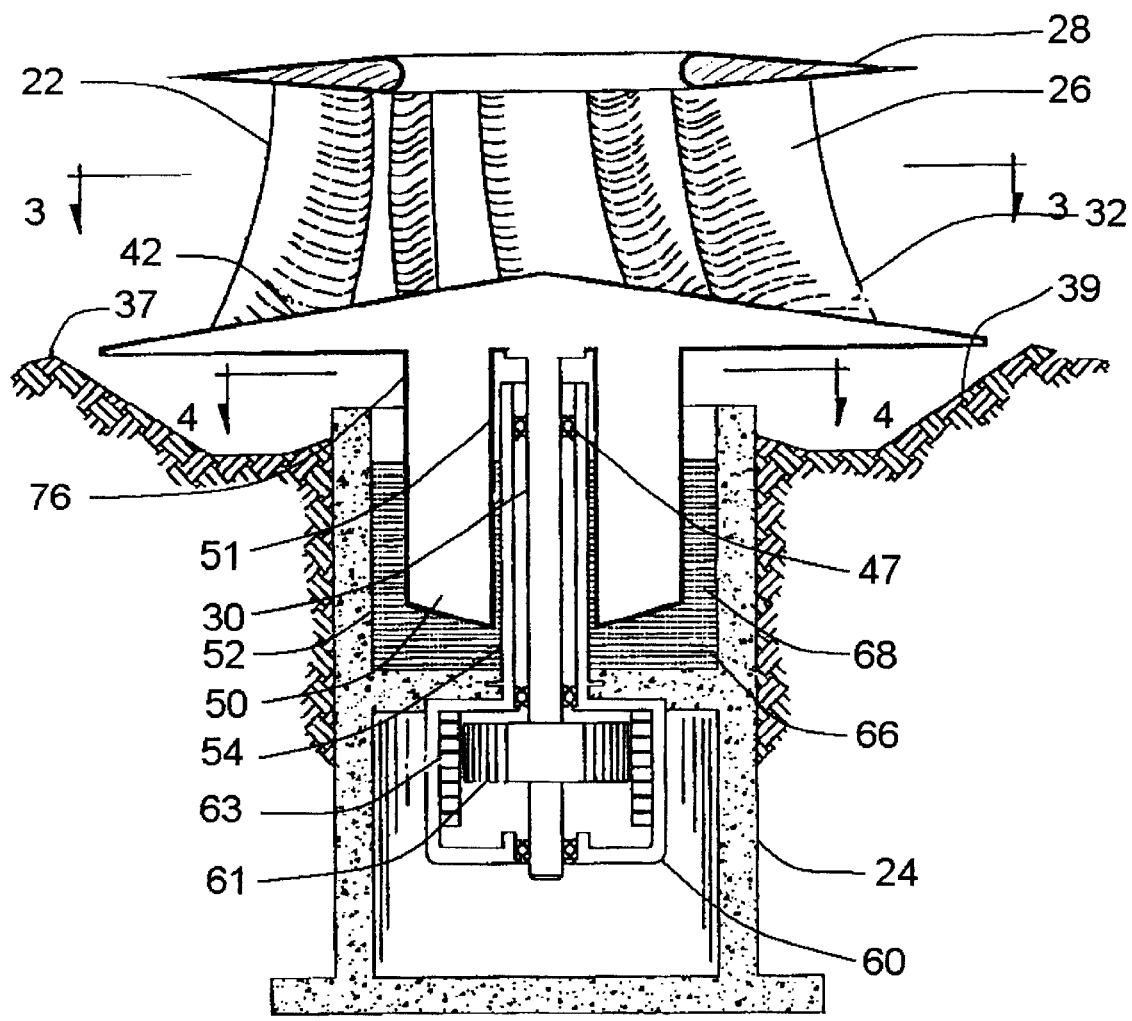
FIG. 2 a section of the wind mill according to line A—A of FIG. 1.
Figure 5C:
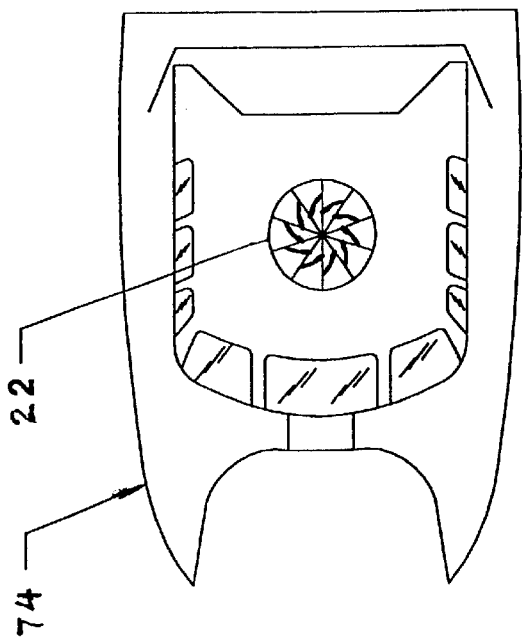
FIG. 5C is a top view of the wind turbine on an electric boat.
Figure 5D:
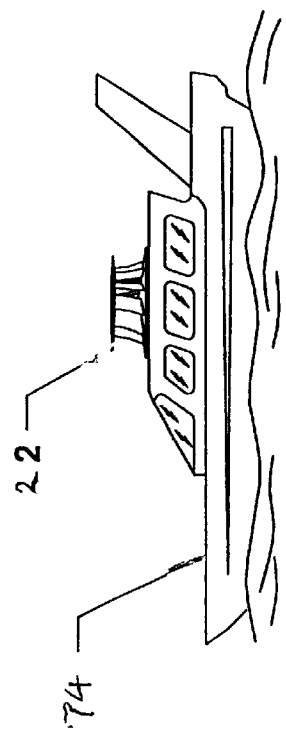
FIG. 5D shows a side view of the electric boat of FIG. 5C.
Figure 5A:
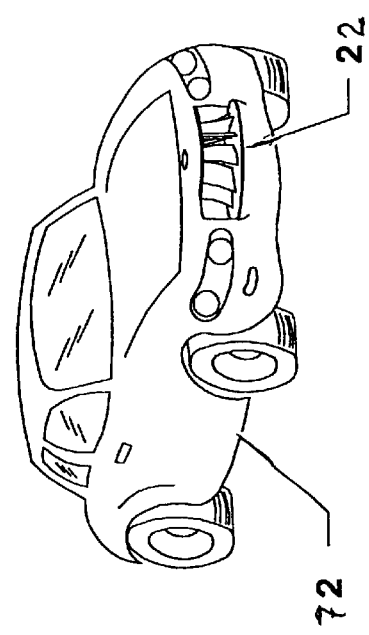
FIG. 5A is a perspective of a wind turbine on an electric car.
Figure 5B:
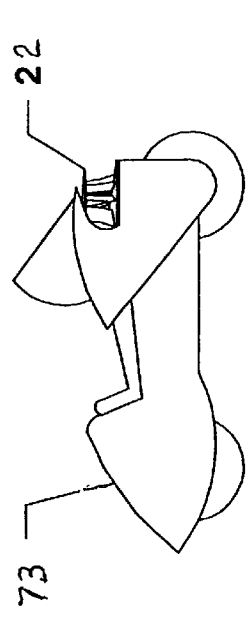
FIG. 5B is a side view of the wind turbine on an electric motor bike.

In the embodiment of FIG. 6 is shown another view of FIG. 2 wherein a number of rotors and stators are superimposed: the floating liquid 68 is in the basin 66 of a height 80 and a diameter 82. The height may be twice the diameter 82 or more. The height of the basin may be equivalent to the breadth 84 of the blade turbine 22. A slim buoy 58 has a reduced diameter and a prolonged height, the height being similar to the breadth 84 of the turbine, the reduced diameter being about one quarter of the breadth 84. Although the same quantity of floating liquid 68 is needed the slim buoy offers less resistance to friction of the turning buoy and permits easier starts and greater acceleration.

Special Construction

The dimensions of a wind mill vary according to the average speed of the winds on a site, such as for a less windy site the wind mill will be taller, but at equal wind a wind mill double in diameter would require four times more material, but one would increase by eight times its volume of air and energy. Before using water as a support, it was not conceivable to produce a gigantic wind turbine, such as with a diameter of 500 feet, blades of 125 feet in height and 50 feet of width, for 24,543,750 cubic feet of air. Aluminium weight 1,000 tons.

Other embodiments are possible and limited only by the scope of the appended claims:

PARTS LIST

20 Wind mill
22 Turbine
24 Foundation
26 Collection section
28 Cone roof
30 Vertical axis
32 Blades
36 Ground
38 Door
40 Window
42 Tunnel floor
44 Angle
46 Openings
47 Ball bearings
50 Buoy
51 Cylindrical opening
52 External wall
54 Cylindrical upright
58 Slim buoy
60 Alternator
61 Rotor
63 Stator
66 Basin
68 Floating liquid
72 Automobile
73 Motocycle
74 Boat
76 Buoy diameter
78 Buoy height
80 Basin height
82 Basin diameter
84 Breadth

I claim:

1. A wind mill (20) with vertical axis (30) adapted to be installed upon a foundation (24) at a certain elevation with respect to the ground (36), said wind mill comprising, in combination:

a turbine (22) comprising a collection section (26) for wind, disposed over a circular tunnel floor (42), said collection section comprising a number of blades (32) disposed at an angle alpha (44), thereby leaving openings (46) between each said blade to cover the periphery of said floor (42) by said blades and said openings, said collection section defining an annular chamber adapted to receive wind passing through said openings;

an annular buoy (50) mounted under said floor (42) and adapted to support said collection section (26) over a fluid (68), said buoy (50) comprising a centrally located cylindrical opening (51), a central shaft (30) disposed centrally of said cylindrical opening (51), said central shaft having a fore end (86) and an aft end (88), said fore end being mounted under said floor (42);

a basin (66) mounted upon said foundation (24) and comprising an interior wall (52) and a central hub (54) and comprising, between said interior wall and said central hub, a fluid (68) to buoy said turbine (22); said central hub (54) installed in a space between said cylindrical opening (51) and said central shaft and comprising means to guide said central shaft (30);

an output connected to said collection section (26) by means of said central shaft to transmit a rotating movement of said turbine to a piece of machinery (60).

2. The wind mill of claim 1 wherein said fluid in said basin may be used to elevate or lower said section (26) with respect to said ground, said fluid eliminating friction and permitting a rapid movement.

3. The wind mill of claim 1 wherein the number of said blades varies between 2 and 32 and are distributed over cardinal points and corresponding directions, said angle alpha (44) varying between 11 and 180 degrees.

4. The mill of claim 1 wherein said buoy (50) comprises an internal cavity wherein a liquid may be added to increase the weight of said buoy (50) to modify the vertical position with respect to said basin (66), said basin having a basin diameter (82), said buoy having a buoy diameter (76) and a buoy height (78), said buoy height corresponding to 40% to 100% of said turbine breadth (84) +/−20%.

5. The mill of claim 4 wherein said buoy diameter is from 40% to 75% of said basin diameter.

6. The mill of claim 4 wherein said buoy diameter is from 20% to 40% of said turbine diameter +/−10%.

7. The mill of claim 1 wherein said means to guide comprise at least two bearings (47) disposed at the top and bottom of said central shaft.

8. The mill of claim 7 wherein said free lower aft end (88) is moving vertically, up and down, said aft end comprising a number of rotors, superposed one on top of the other, at least one rotor being adapted to contact a stator to transmit energy thereto according to a defined wind program.

9. The mill of claim 1 wherein said ground (36) comprises a hillock (37) to accelerate wind flow and protect water from freezing, a top portion thereof comprising a crater (39) and said foundation (24) is built within said crater and comprises working space (30) under said basin and access of said machinery to the outside to said ground (36).

* * * * *